(12) United States Patent
Wang et al.

(10) Patent No.: US 9,972,991 B2
(45) Date of Patent: May 15, 2018

(54) PROTECTION DEVICE AND CIRCUIT PROTECTION APPARATUS CONTAINING THE SAME

(71) Applicant: Polytronics Technology Corp., Hsinchu (TW)

(72) Inventors: David Shau Chew Wang, Taipei (TW); Tongcheng Tsai, Tainan (TW); Tsungmin Su, Hsinchu (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 3 days.

(21) Appl. No.: 15/285,807

(22) Filed: Oct. 5, 2016

(65) Prior Publication Data

US 2017/0338645 A1    Nov. 23, 2017

(30) Foreign Application Priority Data

May 20, 2016   (TW) .............................. 105115888 A

(51) Int. Cl.
*H02H 3/24*      (2006.01)
*H01H 85/02*     (2006.01)
*H01H 85/046*    (2006.01)
*H02H 5/04*      (2006.01)

(52) U.S. Cl.
CPC .......... *H02H 3/24* (2013.01); *H01H 85/0241* (2013.01); *H01H 85/046* (2013.01); *H02H 5/04* (2013.01); *H01H 2085/0283* (2013.01); *H01H 2207/008* (2013.01); *H01H 2231/002* (2013.01)

(58) Field of Classification Search
CPC ............. H01H 85/0241; H01H 85/046; H01H 2085/0283; H01H 2207/008; H01H 2231/002; H02H 3/24; H02H 5/04

USPC ............................................................ 361/86
See application file for complete search history.

(56) References Cited

U.S. PATENT DOCUMENTS

2006/0215342 A1*  9/2006  Montoya ................ H01C 1/148
                                                            361/103
2014/0340046 A1*  11/2014 Komori .................. H01M 2/34
                                                            320/134

FOREIGN PATENT DOCUMENTS

| CN | 101393823 A     | 3/2009  |
|----|-----------------|---------|
| CN | 203799963 U     | 8/2014  |
| CN | 205069566 U     | 3/2016  |
| JP | H10308157 A     | 11/1998 |
| JP | 201504226 A     | 11/2015 |
| TW | 201427790 A     | 7/2014  |
| WO | WO 2016/039208 A1 | 3/2016 |

* cited by examiner

*Primary Examiner* — Thienvu Tran
*Assistant Examiner* — Kevin J Comber
(74) *Attorney, Agent, or Firm* — Muncy, Geissler, Olds & Lowe, P.C.

(57) ABSTRACT

A protection device comprises a first substrate, a second substrate, a fusible element and a heating element. The first substrate comprises a first surface, and the second substrate comprises a second surface facing the first surface. The fusible element is disposed on the first surface of the first substrate, and the heating element is disposed on the second surface of the second substrate and is disposed above the fusible element. When over-voltage or over-temperature occurs, the heating element heats up to blow the fusible element and thereby providing over-voltage and over-temperature protection.

21 Claims, 16 Drawing Sheets

PROTECTION DEVICE AND CIRCUIT PROTECTION APPARATUS CONTAINING THE SAME

BACKGROUND OF THE INVENTION

(1) Field of the Invention

The present application relates to a protection device and a circuit protection apparatus containing the same. More specifically, it relates to a protection device and a circuit protection apparatus containing the same capable of preventing over-voltage, over-current and/or over-temperature.

(2) Description of the Related Art

Fuses containing low-melting metals, e.g., lead, tin or antimony, are well-known protection devices to cut off currents. To prevent over-current and over-voltage, various protection devices are continuously developed. For example, a device containing a substrate on which a heating layer and a low-melting metal layer are stacked in sequence. The heating layer heats up in the event of over-voltage, and then the heat is transferred upwards to the low-melting metal layer. As a result, the low-melting metal layer is melted and blown to sever currents flowing therethrough, so as to protect circuits or electronic apparatuses.

Recently, mobile apparatuses such as cellular phones and laptop computers are widely used, and people increasingly rely on such products over time. However, burnout or explosion of batteries of cellular phones or portable products during charging or discharging is often seen. Therefore, the manufacturers continuously improve the designs of over-current and over-voltage protection devices to prevent the batteries from being blown due to over-current or over-voltage during charging or discharging.

In a know protection device, the low-melting metal layer is in series connection to a power line of a battery, and the low-melting metal layer and a heating layer are electrically coupled to a switch and an integrated circuit (IC) device. When the IC device detects an over-voltage event, the IC device enables the switch to "on". As a result, current flows through the heating layer to generate heat to melt and blow the low-melting metal layer, so as to sever the power line to the battery for over-voltage protection. Moreover, it can be easily understood that the low-melting metal layer, e.g., fuses, can be heated and blown by a large amount of current in the event of over-current, and therefore over-current protection can be achieved also.

FIG. 1 shows a known cross-sectional view of a protection device implementing the above-mentioned protection mechanism. A protection device 100 comprises a substrate 110, a heating element 120, an insulating layer 130, a low-melting metal layer 140, a flux 150 and a housing 170. The housing 170 is placed on the substrate 110 and has an internal space to receive the heating element 120, the insulating layer 130, the low-melting metal layer 140 and the flux 150. The heating element 120 is disposed on the substrate 110 and electrically connects to two heating element electrodes 125. The low-melting metal layer 140 connects to electrodes 160 at two sides and an intermediate electrode 165 in the middle. The insulating layer 130 covers the heating element 120 and the heating element electrodes 125. The low-melting metal layer 140 is disposed above the insulating layer 130 to be a fuse, and is overlaid by the flux 150. As a result, the heating element 120 heats up to melt the low-melting layer 140, and then the low-melting metal layer 140 flows to the two electrodes 160 and the intermediate electrode 165. More specifically, the two electrodes 160 and the intermediate electrode 165 accumulate the melted metal of the low-melting metal layer 140, resulting in that the low-melting metal layer 140 is divided into three pieces to cut off the current flowing through it for protection. Because the three electrodes 160 and 165 are disposed below the low-melting metal layer 140, the upper surface of the low-melting metal layer 140 would be exposed to atmosphere. Although the flux 150 such as rosin are provided on the low-melting metal layer 140 for protection, the rosin at a high temperature would flow or volatilize to diminish protection functionality. Therefore, an oxidation film that would be formed on the low-melting metal layer 140 during melting at a high temperature hinders accumulation of melting metal to the three electrodes 160 and 165. As a result, the low-melting metal layer 140 is not easily blown to interrupt current, inducing inaccurate melting time, i.e., fuse opening time.

With miniaturization of mobile electronic apparatuses, thin devices to be used in the apparatuses are demanded. The housing 170 of the protection device 100 has a certain height to receive the internal components, thus the height of the housing 170 is not easily decreased to meet the requirement of thin protection devices. Besides, the housing 170 usually is formed by injection molding, and it is costly to make a mold. Therefore, it is hard to lower manufacturing expense for the design of the protection device 100.

SUMMARY OF THE INVENTION

The present application provides a protection device and a circuit protection apparatus containing the same for over-current, over-voltage and/or over-temperature protection. It is advantageous to make a thin protection device in accordance with the present application, so as to meet the requirement of miniaturization.

In accordance with a first aspect of the present application, a protection device comprises a first substrate, a second substrate, a fusible element and a heating element. The first substrate comprises a first surface, and the second substrate comprises a second surface facing the first surface. The fusible element is disposed on the first surface of the first substrate. The heating element is disposed on the second surface of the second substrate and is disposed above the fusible element. The heating element heats up to blow the fusible element in the event of over-voltage or over-temperature.

In an embodiment, the fusible element comprises a low-melting metal. The low-metal metal is melted and is absorbed upwards and downwards when the fusible element is blown.

In an embodiment, there is a metal layer disposed on or above the fusible element. In particular, the metal layer is disposed between the fusible element and heating element, and the metal layer accumulates and absorbs melted low-melting metal from above. In other words, the melted low-melting metal is absorbed upwards.

In an embodiment, the fusible element is in direct contact with the metal layer, or a gap is formed therebetween and the gap is filled with solder to connect the fusible element and the metal layer.

In an embodiment, the gap is equal to or less than 1.5 mm.

In an embodiment, the distance between the first substrate and the second substrate is 0.03-1.5 mm, preferably 0.04-1 mm and most preferably 0.05-0.5 mm.

In an embodiment, the protection device has a thickness of 0.2-2 mm, preferably 0.4-1.5 mm, or most preferably 0.5-1 mm, achieving thin device performance.

In an embodiment, the fusible element has a thickness of 0.005-1 mm, preferably 0.01-0.5 mm, and most preferably 0.02-0.2 mm.

In an embodiment, the protection device further comprises first and second electrodes disposed on the first surface, and two ends of the fusible element connects to the first and second electrodes.

In an embodiment, the protection device further comprises a third electrode disposed on the first surface. The third electrode may serve as an intermediate electrode of the fusible element and electrically connects to an end of the heating element. As a result, the fusible element forms a circuit containing two fuses. In particular, the third electrode comprises a primary portion and an extending portion, and a central portion of the fusible element connects to the extending portion. Alternatively, the third electrode does not serve as an intermediate electrode and directly connects to the second electrode to form electrical connection, and as a result the fusible element forms a circuit containing a fuse.

In an embodiment, the protection device further comprises a fourth electrode disposed on the first surface, and the fourth electrode electrically connects to another end of the heating element.

In an embodiment, the first electrode, the second electrode, and the extending portion of the third electrode have the same thicknesses, and the primary portion of the third electrode and the fourth electrode are thicker than the extending portion of the third electrode.

In an embodiment, the first electrode, the second electrode and the fourth electrode electrically connects to a first bonding pad, a second bonding pad and a third bonding pad on the underside of the first substrate, respectively.

In an embodiment, the protection device has an equivalent circuit in which the fusible element comprises one or two fuses, and the heating element comprises a heater, e.g., a resistor.

In an embodiment, the second surface of the second substrate is provided with a fifth electrode and a sixth electrode. The fifth electrode connects to the third electrode, and the sixth electrode connects to the fourth electrode. In particular, the fifth electrode and the sixth electrode may comprise extending portions to connect to two ends of the heating element.

In an embodiment, the primary surfaces of the extending portions of the fifth and sixth electrodes in contact with the heating element are formed at opposite sides of the heating element.

In an embodiment, the protection device further comprises an insulating layer filled in between the fusible element and the first substrate.

In an embodiment, the heat conductivity of the second substrate is less than 30 W/m·K, so as to diminish heat dissipation of the heating element. As a result, the heat can be concentrated and transferred to the fusible element to increase blowing efficiency.

In an embodiment, the protection device further comprises a spacer group to form a space between the first surface and the second surface to receive the fusible element and the heating element.

In an embodiment, an upper surface of the second substrate is provided with a thermal conductive layer for heat dissipation to avoid cracks in the second substrate.

In accordance with a second aspect of the present application, a circuit protection apparatus comprises the aforementioned protection device associated with a detector and a switch. The detector detects voltage drops or temperatures of a circuit to be protected, and the switch is coupled to the detector to receive its sensing signals. When a voltage drop or a temperature exceeds a threshold value, the switch turns on to allow current to flow through the heating element by which the heating element heats up to melt and blow the fusible element.

In an embodiment, the fusible element of the protection device of the circuit protection apparatus comprises low-melting metal. The low-metal metal is melted and is absorbed upwards and downwards when the fusible element is blown.

In an embodiment, the detector and the switch are placed on the first surface.

In an embodiment, the first substrate comprises a protruding portion extending from a side of the first substrate and sticking out of the second substrate. The detector and the switch are disposed on the first surface of the protruding portion.

In an embodiment, the lower surface of the first substrate is provided with a first bonding pad, a second bonding pad and a third bonding pad. The first bonding pad electrically connects to an end of the fusible element and the detector. The second bonding pad electrically connects to another end of the fusible element and the heating element. The third bonding pad electrically connects to the switch.

In the aforesaid embodiments, the first surface of the first substrate is provided with the first electrode, the second electrode and the third electrode. That is, there are three electrodes disposed below the fusible element to absorb melted low-melting metal. In addition, unlike prior arts, at least one metal layer disposed on or above the fusible element and below the heating element is able to absorb the low-melting metal as well. When the heating element heats up, the heat is transferred to an upper surface of the fusible element through the metal layer. As a result, the low-melting metal of the fusible element melts and is absorbed upwards by the metal layer and therefore an oxidization layer is not easily formed on the fusible element. The heat continues to transfer downwards to the fusible element and the three electrodes below the fusible element, and accordingly the melted low-melting metal is absorbed downwards by the three electrodes to blow the fusible element and cut off current flowing through it. In accordance with the present application, both the upper metal layer and the three lower electrodes absorb the melted low-melting metal to overcome the problem of inaccurate melting time of the low-melting metal in the prior arts.

The protection device of the present application can be made by printing processes to obtain a very thin structure to meet the demands of miniaturization and thinning tendency. Because injection molding is not used in the processes of the present application, the molding expense can be saved. In terms of process, the protection device may be a combination of a fusible module and a heating module which can be made individually and simultaneously to improve manufacturing throughput. One more advantage is that the defective ones of the fusible module and the heating module can be removed before the completion of the protection device so as to diminish the loss of scrapped defective products. Compared to the prior arts, the melting times, i.e., fuse opening times, of the protection devices of the present application are more concentrated (smaller standard deviation), indicating better stability of quality.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
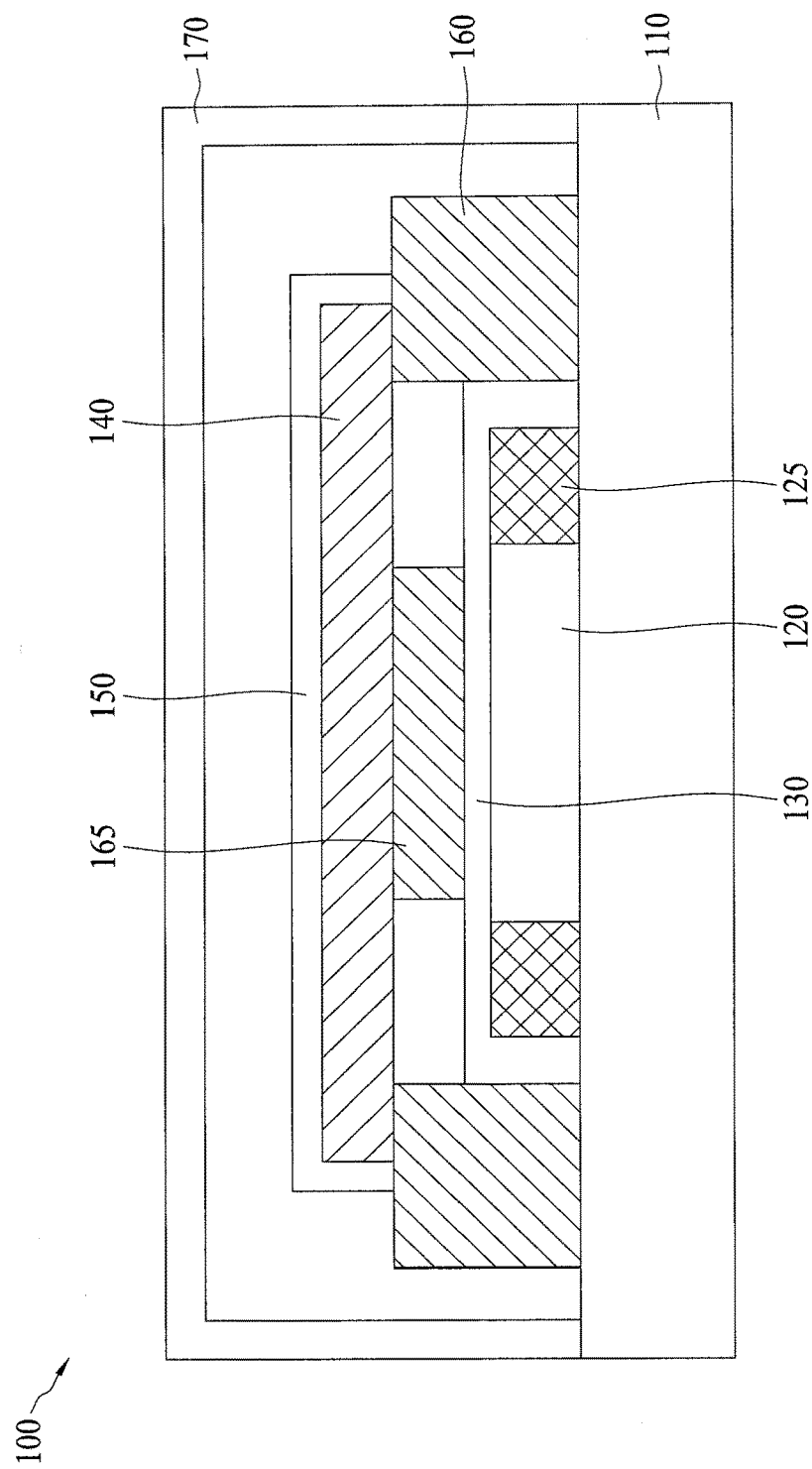
FIG. 1 shows a known protection device.
Figure 2:
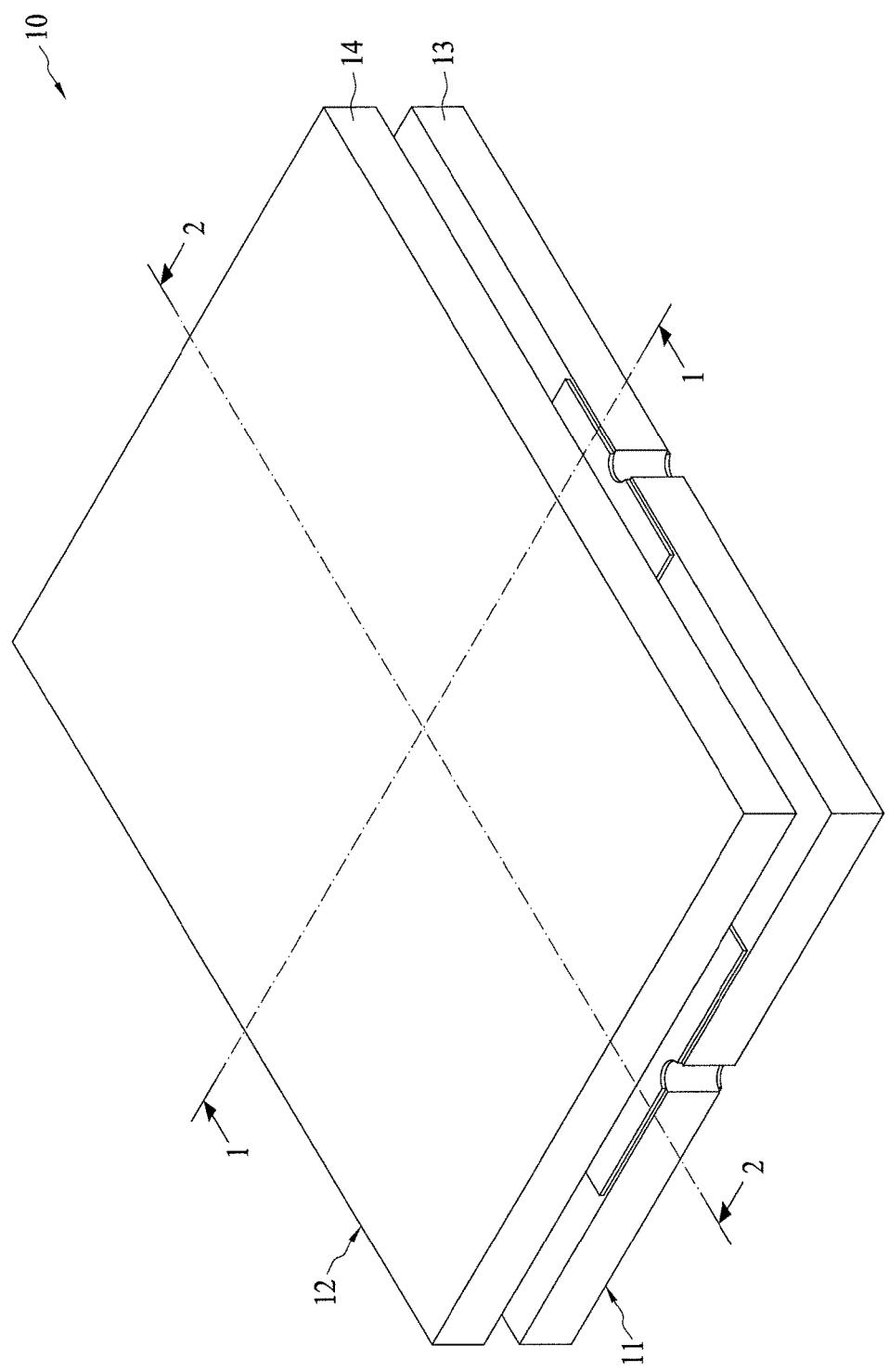
FIG. 2 shows a protection device in accordance with an embodiment of the present application.
Figure 3:
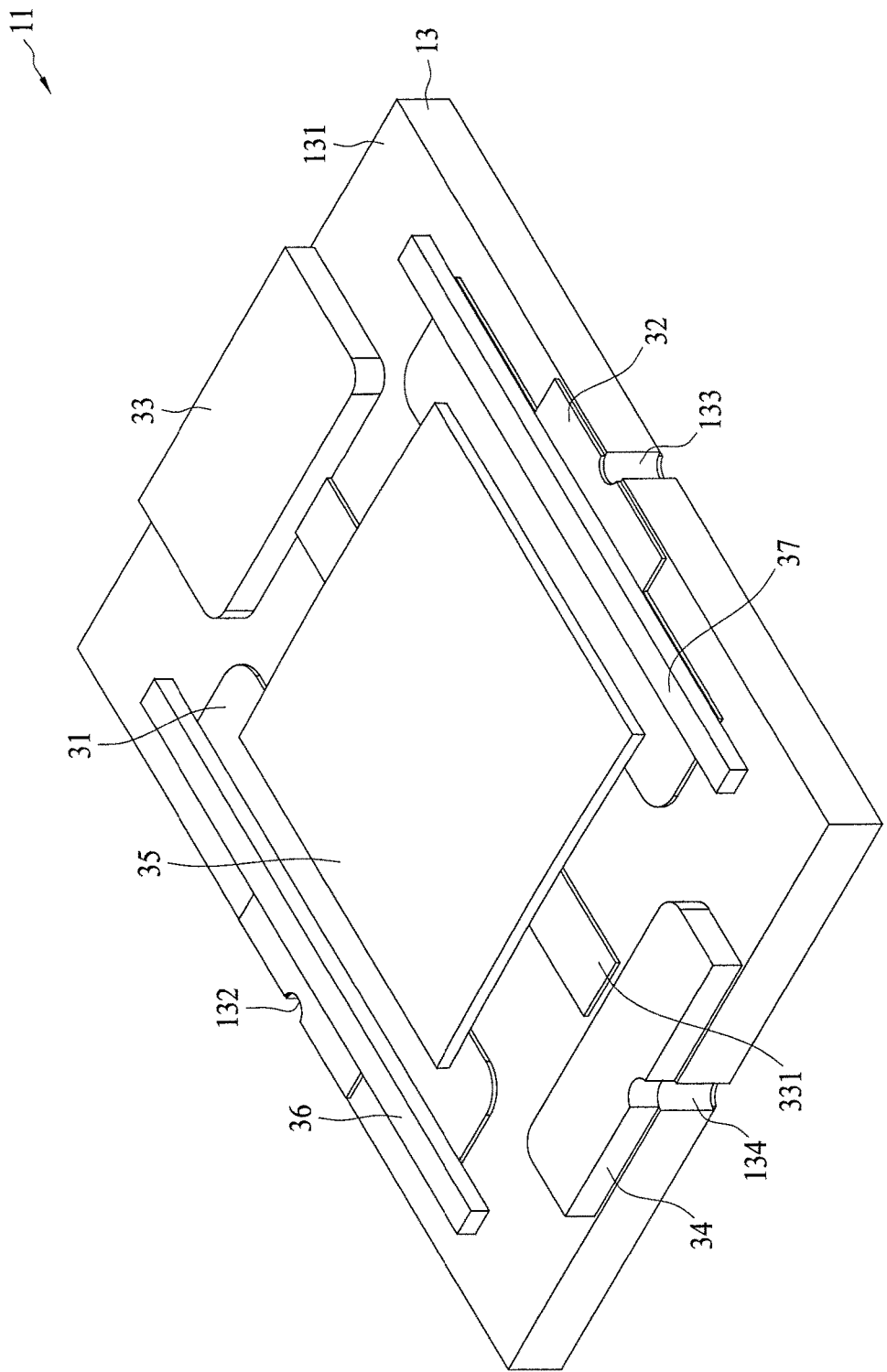
FIG. 3 shows a fusible module of the protection device in accordance with an embodiment of the present application.
Figure 4:
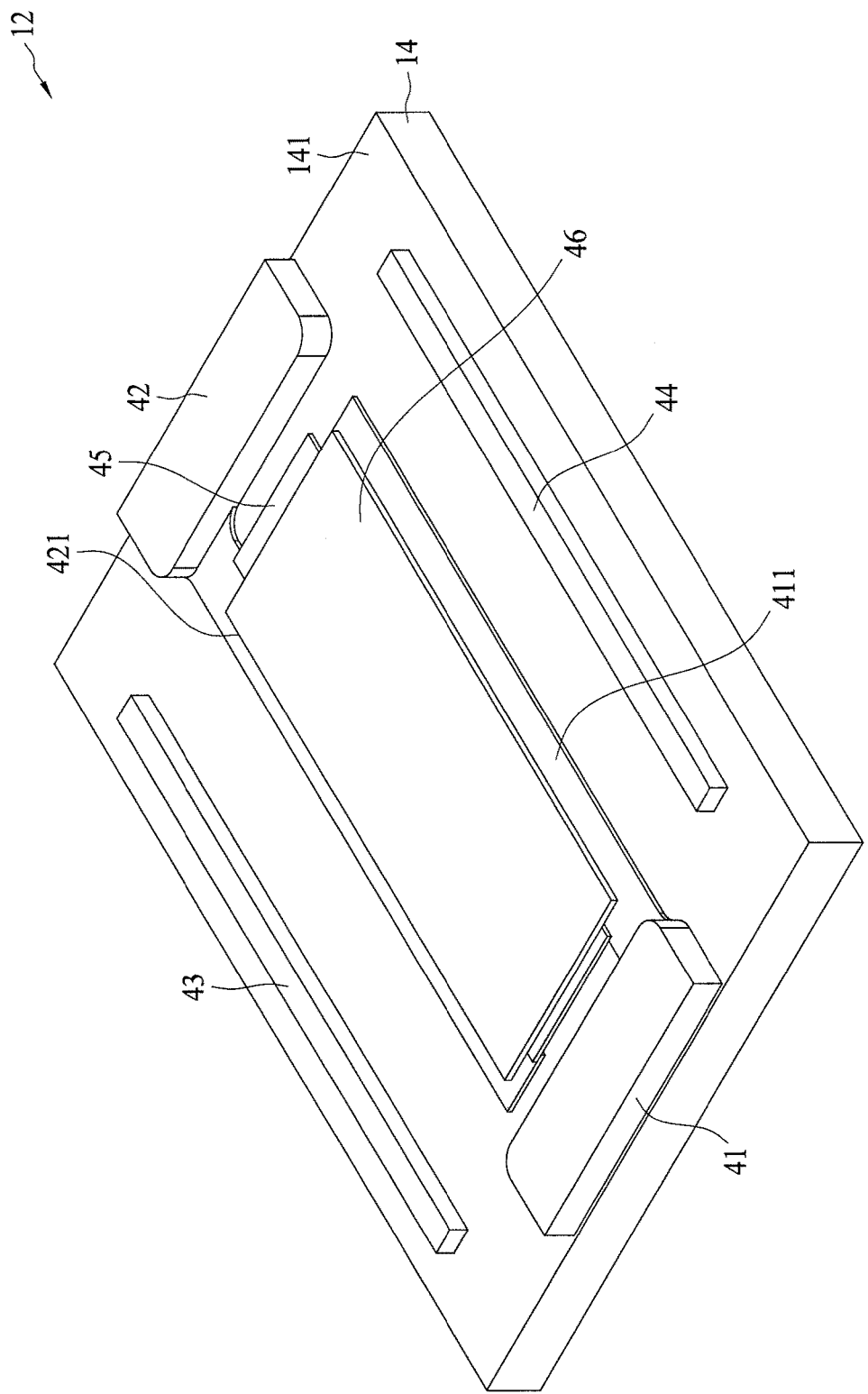
FIG. 4 shows a heating module of the protection device in accordance with an embodiment of the present application.
Figure 5:
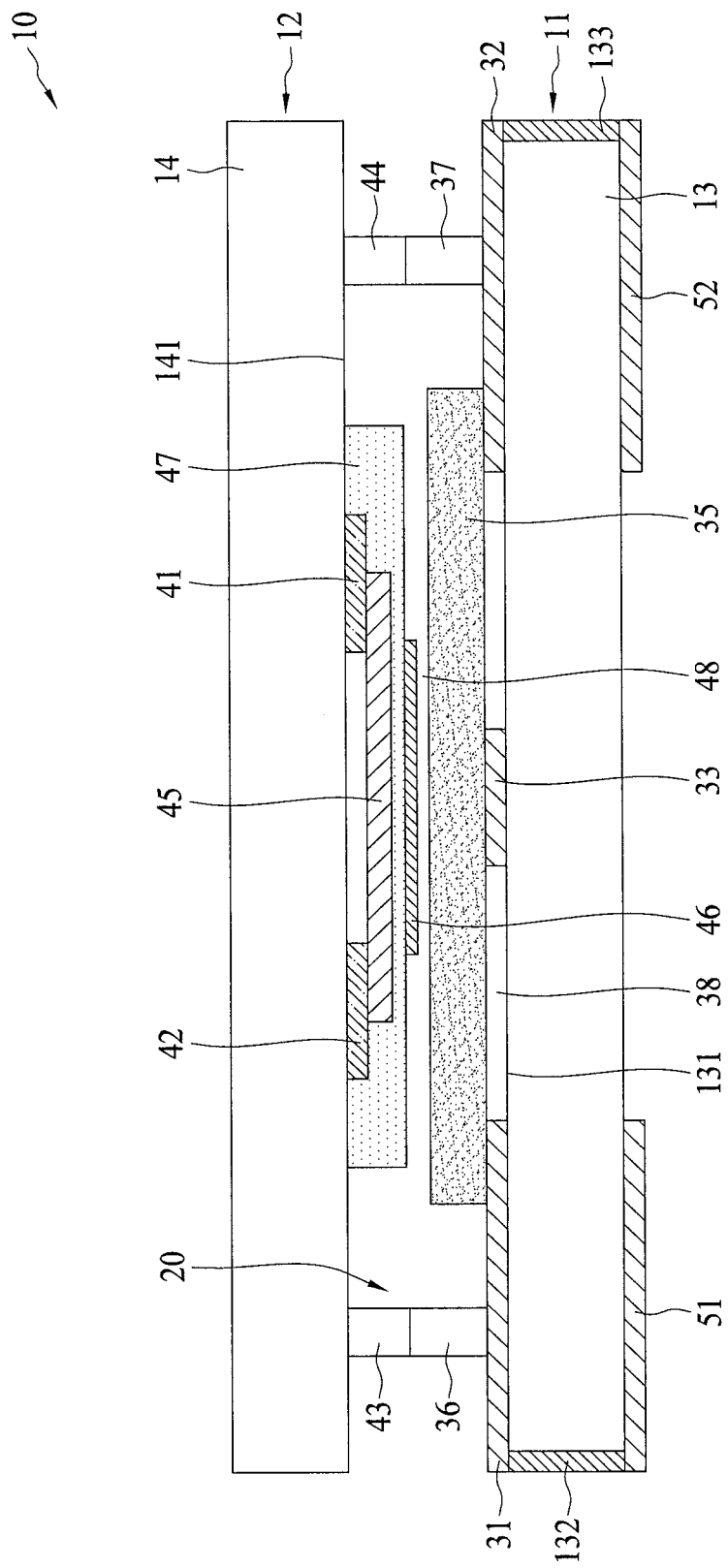
FIG. 5 shows a cross-sectional view of the protection device along the line 1-1 in FIG. 2.
Figure 6:
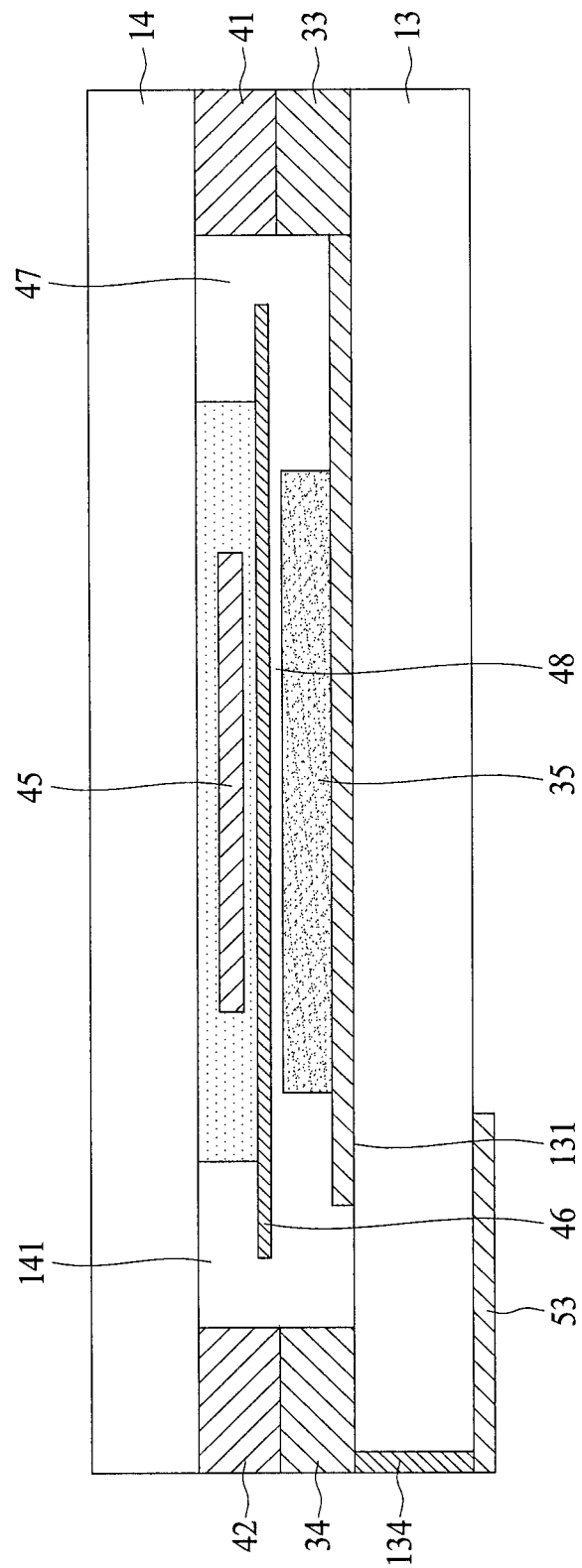
FIG. 6 shows a cross-sectional view of the protection device along the line 2-2 in FIG. 2.

FIG. 2 shows a protection device in accordance with a first embodiment of the present application. A protection device 10 essentially comprises two modules in which a fusible module 11 is built on a basis of a first substrate 13 and a heating module 12 is built on a basis of a second substrate 14. The heating module 12 has an equivalent or smaller area compared to the fusible module 11, and the heating module 12 is disposed above the fusible module 11 to form a rectangular cuboid structure. To clearly describe the structure of the protection device 10, the drawings show the three-dimensional structures of the fusible module 11 and the heating module 12, and the cross-sectional views of the protection device 10 at different angles. FIG. 3 shows the fusible module 11, and FIG. 4 shows the heating module 12. FIG. 5 illustrates a cross-sectional view of the protection device 10 along the line 1-1 in FIG. 2, and FIG. 6 illustrates another cross-sectional view of the protection device 10 along the line 2-2 in FIG. 2.

In FIG. 3, the fusible module 11 uses a first substrate 13 as a carrier, which may be a rectangular insulating substrate including aluminum oxide, aluminum nitride, zirconium oxide and/or an epoxy substrate containing fiberglass. A first electrode 31, a second electrode 32, a third electrode 33 and a fourth electrode 34 are disposed on a first surface 131 of the first substrate 13. In particular, the electrodes 31, 32, 33 and 34 are placed at four sides of the first substrate 13. The first electrodes 31 and the second electrode 32 are placed at two opposite sides of the first substrate 13, whereas the third electrode 33 and the fourth electrode 34 are mainly placed at another two opposite sides of the first substrate 13. In an embodiment, the electrodes 31, 32, 33 and 34 may comprise silver, gold, copper, tin, nickel or other conductive metals, and its thickness is approximately 0.005-1 mm, or 0.01 mm, 0.05 mm, 0.1 mm, 0.3 mm or 0.5 mm. A fusible element 35 has two ends connecting to the first electrode 31 and the second electrode 32 to form a conductive path. The fusible element 35 may comprise low-melting metal or its alloy, e.g., Sn—Pb—Ag, Sn—Ag, Sn—Sb, Sn—Ag—Cu. The length and width of the fusible element 35 vary according to the designated current flowing therethrough, but they cannot exceed the length and width of the first substrate 13. The thickness of the fusible element 35 is 0.005-1 mm, preferably 0.01-0.5 mm, and most preferably 0.02-0.2 mm. The third electrode 33 comprises a primary portion at a side of the first substrate 13 and an extending portion 331 extending over the underside of the fusible element 35 and connecting to the fusible element 35 for electrical connection. Accordingly, the third electrode 33 serves as an intermediate electrode for the fusible element 35. When the fusible element 35 is melted, its low-melting metal is absorbed downwards by the three electrodes 31, 32 and 33 to blow the fusible element 35 and cut off current flowing through it. A first spacer 36 and a second spacer 37 in a strip shape are located opposite at two sides of the first surface 131, and are disposed on the first electrode 31 and the second electrode 32, respectively. The first spacer 36 and the second spacer 37 usually have, but not limited to, equivalent heights. The spacers 36 and 37 may have other sizes, heights or shapes, as long as they can form an accommodating space between the fusible module 11 and the heating module 12.

FIG. 4 shows a turnover view of the heating module 12 in FIG. 2. The heating module 12 uses the second substrate 14 as a carrier which may be a rectangular insulating substrate including aluminum oxide, aluminum nitride, zirconium oxide and/or an epoxy substrate containing fiberglass. A fifth electrode 41 and a sixth electrode 42 are disposed on a second surface 141 of the second substrate 14, and are located opposite at two sides of the second substrate 14. The fifth electrode 41 comprises a primary portion located at a side of the second substrate 14 and an extending portion 411. The sixth electrode 42 comprises a primary portion located at another side of the second substrate 14 and an extending portion 421. An interval between the extending portions 411 and 421 is formed approximately at the center of the second surface 141. The heating element 45 has two ends connecting to the extending portion 411 of the fifth electrode 41 and the extending portion 421 of the sixth electrode 42 to form an electrical conductive path. A third spacer 43 and a fourth spacer 44 in a strip shape are located opposite at another two sides of the second surface 141. The third spacer 43 and the fourth spacer 44 usually have, but not limited to, the same heights. The spacers 36, 37, 43 and 44 may be made by multi-layer printing to obtain superior structural strength. Alternatively, the spacers 36, 37, 43 and 44 may be blocks made by injection molding first and then being disposed on the first substrate 13 and the second substrate 14.

In an embodiment, low-melting tin plate soldering and thick-film printing are employed to form the fusible element 35, the heating element 45, and the electrodes 31, 32, 33, 34, 41 and 42 on the first substrate 13 of the fusible module 11 and the second substrate 14 of the heating module 12. After completing the fusible module 11 and the heating module 12, they are combined to form the protection device 10. Because the fusible module 11 and the heating module 12 can be made by printing and a housing to cap the fusible element and the heating element is not needed, a thin protection device 10 can be obtained. Compared to formation of a fusible element and a heating element on the same substrate, the formation of fusible module 11 and the heating module 12 on different substrates can diminish manufacturing complexity. In an embodiment, the area of the heating module 12 may be slightly smaller than that of the fusible module 11; that is, the second substrate 14 is smaller than the first substrate 13. Accordingly, the heating module 12 can be easily put in a fixture to combine with the fusible module 11. Because the fusible module 11 and the heating module 12 are made individually, it is advantageous to remove defective products of the module 11 and/or 12 individually and thereby increasing yield of the protection device 10 and decreasing manufacturing cost. Nevertheless, it is not limited to individually make the fusible module 11 and the heating module 12, any protection devices with aforesaid specific structures should be covered by the scope of the present application.

FIG. 5 shows a cross-sectional view of the protection device 10 along the line 1-1 in FIG. 2, and FIG. 6 shows a cross-sectional view of the protection device 10 along the line 2-2 in FIG. 2. The third spacer 43 corresponds to the first spacer 36, and therefore the third spacer 43 is stacked on the first spacer 36 after combination of the fusible module 11 and the heating module 12. The fourth spacer 44 corresponds to the second spacer 37, and the fourth spacer 44 is stacked on the second spacer 37 after combination. The first spacer 36, the second spacer 37, the third space 43 and the fourth spacer 44 constitutes a spacer group 20 which forms an accommodating space between the first surface 131 of the first substrate 13 and the second surface 141 of the second substrate 14 to receive the fusible element 35 and the heating element 45. In summary, the spacer group 20 comprises a first spacer 36 and a second space 37 disposed on the first surface 131, and a third spacer 43 and a fourth spacer 44 disposed on the second surface 141. The third spacer 43 is disposed on the first spacer 36, and the fourth spacer 44 is disposed on the second spacer 37. The spacers of the present application are not limited to the above-mentioned embodiments. Various spacer structures, e.g., four posts at four corners, which are able to form a distance separating the first substrate 13 from the second substrate 14, are covered by the scope of the present application. Alternatively, if the electrodes 33, 34, 41 and 42 can effectively separate the first substrate 13 from the second substrate 14 by an interval, the spacers 36, 37, 43 and 44 can be omitted.

In an embodiment, the gap between the fusible element 35 and the first substrate 13 is filled with an insulating layer 38 to support the fusible element 35 to avoid deformation. An insulating layer 47 is formed on a surface of the heating element 45 to isolate the heating element 45 from the fusible element 35. The insulating layer 47 may further cover the fifth electrode 41 and the sixth electrode 42. The insulating layer 47 may comprise glass, epoxy, aluminum oxide or silicone. A metal layer 46 may be formed below the heating element 45 by silver ink printing or electroplating. The metal layer 46 may comprise a single member or multiple members in various shapes such as a strip, a block, a spot or a curve. The composition of the metal layer 46 may comprise silver, gold, copper, nickel, tin, lead, antimony, or alloy thereof, and may be in the form of a single layer or multiple layers. The metal layer 46 may be in direct contact with the fusible element 35 or be distanced from the fusible element 35 by a gap 48. In an embodiment, the gap 48 does not exceed 1.5 mm, 1 mm or 0.5 mm. The gap 48 may be filled with solder to connect the fusible element 35 and the metal layer 46, and therefore the heat generated by the heating element 45 can be rapidly transferred to the fusible element 35 through the solder and the metal layer 46. The metal layer 46 together with solder formed thereon upwards absorbs melted metal of the fusible element 35 to avoid uncontrolled melting flow. The gap 48 may be filled with rosin, soft metal or flux instead of solder as long as they can from above absorb and accumulate the melted metal of the fusible element 35 as well. The heating element 45 is located in a place corresponding to the fusible element 35, and therefore the heat generated by the heating element 45 can be effectively transferred to the fusible element 35 so as to blow the fusible element 35. In other words, the metal layer 46 is disposed on or above the fusible element 35 to upwards absorb the low-melting metal when it is melted or blown. However, the metal layer 46 may be omitted if upward absorption and/or blowing of the fusible element 35 can be well conducted by the heating element 45. In an embodiment, the second substrate 14 may be a thermal insulating material with a heat conductivity less than 30 W/m·K, 10 W/m·K, 5 W/m·K or 0.5 W/m·K. In particular, an upper surface of the second substrate 14 may be provided with a thermal insulating layer to decrease heat dissipation. Accordingly, the heat generated by the heating element 45 can be concentrated and transferred to the fusible element 35 to speed up melting or blowing and prevent a high-temperature upper surface of the protection device 10 which may impact electronic devices in the vicinity. However, if the heating element 45 is sufficient to effectively blow the fusible element 35, the second substrate 14 may not need to have thermal insulating function. To the contrary, it should be noted that an overheated second substrate 14 may have cracks. To overcome this problem, an upper surface of the second substrate 14, i.e., another surface opposite to the second surface 141, may be provided with a thermal conductive layer, e.g., a printed silver layer, to increase heat dissipation and thereby avoiding cracks of the second substrate 14. Sequentially, an insulating layer, e.g., a glaze layer, may be formed on the silver layer to prevent unexpected short circuits.

In an embodiment, the primary portion of the third electrode 33 and the fourth electrode 34 may be thicker than the first electrode 31 and the second electrode 32. Moreover, the primary portion of the third electrode 33 is thicker than the extending portion 331, and the thickness of the extending portion 331 is equivalent to the thicknesses of the first electrode 31 and the second electrode 32 so as to horizontally carry the fusible element 35. The fifth electrode 41 and the sixth electrode 42 correspond to the third electrode 33 and the fourth electrode 34, and therefore the fifth and sixth electrodes 41 and 42 can be stacked onto the third and fourth electrodes 33 and 34, respectively. The primary portions of the fifth electrode 41 and the sixth electrode 42 are thicker than their extending portions 411 and 421. When combining the fusible module 11 and the heating module 12, solder or epoxy resin may be employed to connect the third electrode 33 and the fifth electrode 41 for electrical connection and to connect the fourth electrode 34 and the sixth electrode 42 for electrical connection. An objective of the thicker third, fourth, fifth and sixth electrodes 33, 34, 41 and 42 is to form electrical connection therebetween and provide structural support to increase mechanical strength of the protection device 10. It should be noted that the electrodes of this embodiment are merely illustrative and can be modified. For example, the electrodes 33 and 34 on the first substrate 13 may be thin solder layers, and the electrodes 41 and 42 on the second substrate 14 may be thick metal blocks which are adapted to connect to the thin solder layers.

In an embodiment referring to FIGS. 3, 5 and 6, the first electrode 31 connects to a first bonding pad 51 on the bottom of the first substrate 13 through a conductive hole 132 at a side of the first substrate 13. The second electrode 32 connects to a second bonding pad 52 on the bottom of the first substrate 13 through a conductive hole 133 at another side of the first substrate 13. The fourth electrode 34 connects to the third bonding pad 53 on the bottom of the first substrate 13 through a conductive hole 134 at yet another side of the first substrate 13. The first, second and third bonding pads 51, 52 and 53 serve as interfaces to surface-mount or solder the protection device 10 onto a circuit board.

Because the fusible module 11 and the heating module 12 can be made by printing technology, it is advantageous to decrease the thicknesses of the fusible element 35, the heating element 45 and the electrodes 31, 32, 33, 34, 41 and 42. The distance between the first substrate 13 and the second substrate 14 is about 0.03-1.5 mm, preferably 0.04-1 mm, and most preferably 0.05-5 mm, or 0.1 mm, 0.3 mm, 0.7 mm, 1.2 mm in particular. Further adding the first and second substrates 13 and 14, the protection device 10 has a thickness of 0.2-2 mm, preferably 0.4-1.5 mm and most preferably 0.5-1 mm, or 0.3 mm, 0.7 mm, 1.3 mm in particular. It appears that a thin protection device 10 can be effectively obtained. The fusible element 35 and the heating element 45 vary the resistances upon their dimensions. The fusible element 35 of low resistance and the heating element 45 of high resistance can be made accordingly, so as to produce the high-efficiency protection device 10. In an embodiment, the thickness of the fusible element 35 is approximately 0.005-1 mm, preferably 0.01-0.5 mm, and most preferably 0.02-0.2 mm, or 0.05 mm, 0.1 mm, 0.3 mm in particular. Thicker fusible element 35 may be used for the applications of large current, e.g., 30-100 A.

Figure 7:
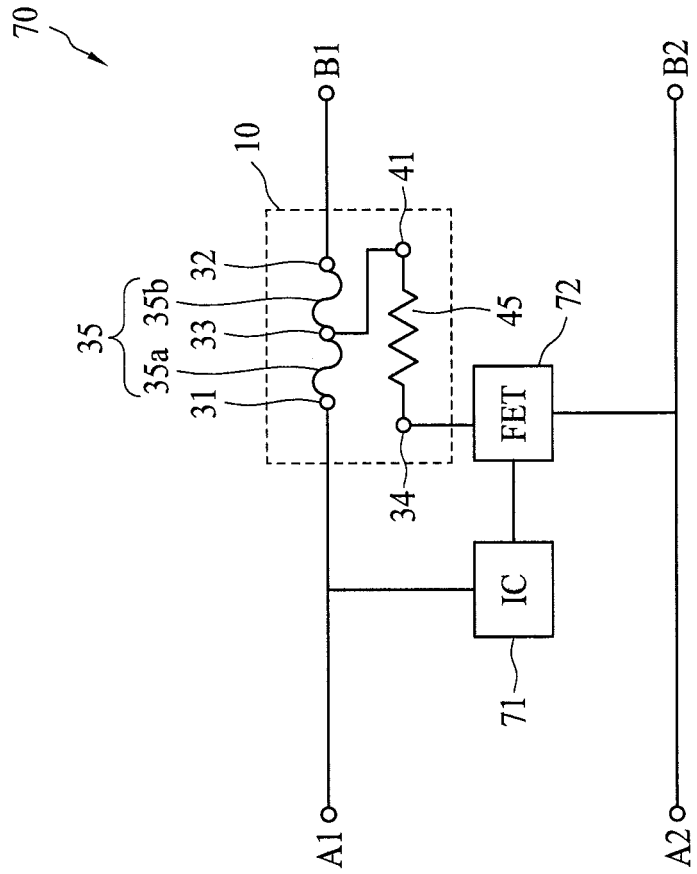
FIG. 7 shows a circuit diagram of a circuit protection apparatus in accordance with an embodiment of the present application.

The equivalent circuit diagram of the protection device 10 of this embodiment is depicted in a dashed-line block in FIG. 7. The first electrode 31 connects to a terminal A1 of an apparatus to be protected such as a secondary battery or a motor, whereas the second electrode 32 connects to a terminal B1 of a charger or the like. The third electrode 33 connects to the fifth electrode 41 of the heating element 45, and the fourth electrode 34 connects to another end of the heating element 45. According to this circuit design of the protection device 10, the fusible element 35 forms a circuit containing two fuses 35a and 35b in series connection, and the heating element 45 forms a heater denoted by a resistor. In an embodiment, the fourth electrode 34 electrically connects to a switch 72, e.g., a field-effect transistor (FET). The switch 72 connects to a detector 71, a terminal A2 of the apparatus to be protected, and a terminal B2 of the charger. The detector 71 may be an IC device capable of sensing voltage drops and temperatures of the circuit. The switch 72 is off if no over-voltage and over-temperature event, current flows through fuses 35a and 35b and no current flows through the heating element 45. At least one of the fuses 35a and 35b is blown in the event of over-current to provide over-current protection. When the detector 71 senses a voltage or a temperature larger than a threshold value, i.e., over-voltage or over-temperature, the switch 72 turns on to allow current to flow through the heating element 45 and accordingly the heating element 45 heats up to blow at least one of the fuse 35a or 35b to provide over-voltage and over-temperature protections. In summary, two power lines of B1 to A1 and B2 to A2 supply power to the circuit to be protected, and the protection device 10, the detector 71 and the switch 72 are coupled to the two power lines to form a circuit protection apparatus 70. If the detector 71 senses a voltage drop or a temperature over a threshold value, then the heating element 45 is activated to blow the fusible element 35.

The protection device 10 of the present application and the traditional protection device 100 are subjected to melting time testing. In Table 1, the protection device 10 is subjected to the test at a power of 6 W, the melting time indicates the time to melt and disconnect the fusible element 35, i.e., fuse opening time. Seven samples are tested, in which the range of the melting times is 6.81-8.93 seconds, and the standard deviation is 0.6586 seconds upon calculation according to the formula (1):

$$\sqrt{\frac{\sum(x-\bar{x})^2}{n}} ; \quad (1)$$

where x is the melting time of each of the samples, $\bar{x}$ is the mean value of x, and n is the number of samples.

TABLE 1

| No | Resistance of heating element (Ω) | Resistance of fusible element (Ω) | Voltage (V) | Current (A) | Power (W) | Melting time (s) |
|---|---|---|---|---|---|---|
| 1 | 0.74 | 0.0035 | 2.76 | 2.19 | 6.04 | 8.22 |
| 2 | 0.717 | 0.0036 | 2.82 | 2.18 | 6.15 | 8.93 |
| 3 | 0.838 | 0.0036 | 2.6 | 2.33 | 6.06 | 8.15 |
| 4 | 0.703 | 0.0034 | 2.24 | 2.65 | 5.94 | 6.81 |
| 5 | 0.724 | 0.0035 | 2.15 | 2.82 | 6.06 | 8.92 |
| 6 | 0.755 | 0.0035 | 2.33 | 2.6 | 6.06 | 7.96 |
| 7 | 0.734 | 0.0036 | 2.28 | 2.56 | 5.84 | 8.17 |
| Max. | 0.838 | 0.0036 | 2.82 | 2.82 | 6.15 | 8.93 |
| Min. | 0.703 | 0.0034 | 2.15 | 2.18 | 5.84 | 6.81 |
| Standard deviation | 0.0412 | 0.0001 | 0.2486 | 0.2273 | 0.094 | 0.6586 |

The same testing at 6 W for the traditional protection device 100 is conducted also, in which the range of melting times is 7.02-12.22 seconds and the standard deviation is 1.835 seconds upon the calculation based on formula (1). The relation of melting time vs. the resistance of heating element of the protection device for the present application and the prior art is shown in FIG. 8.

Figure 9:
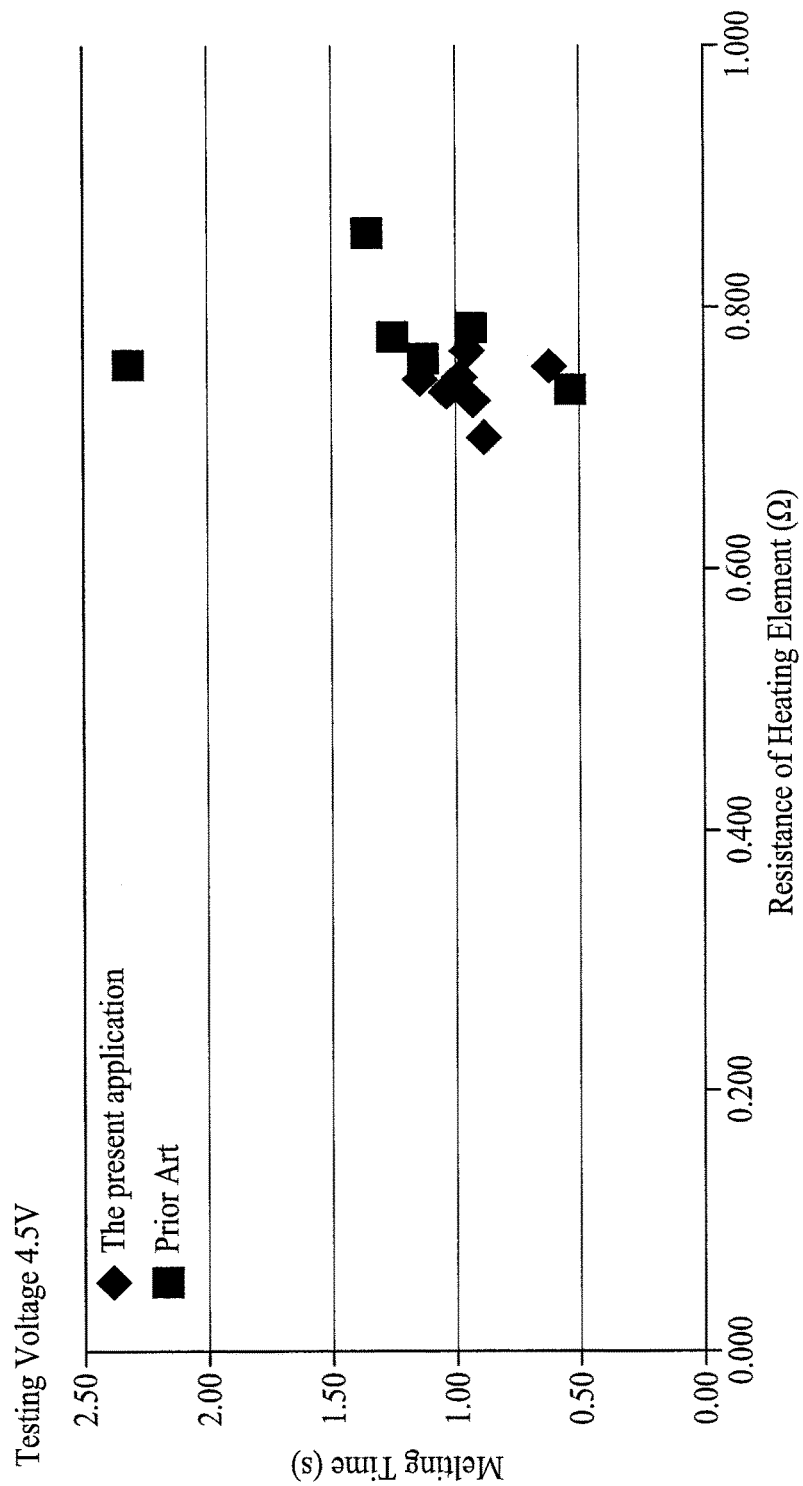

Moreover, the melting time testing at a voltage of 4.5V is conducted, the relation of melting time vs. the resistance of heating element of the protection device for the present application and the prior art is shown in FIG. 9. The standard deviation of the melting times of the prior art is 0.542 seconds, whereas the standard deviation of the melting times of the present application is significantly lowered to 0.1491 seconds.

Figure 8:
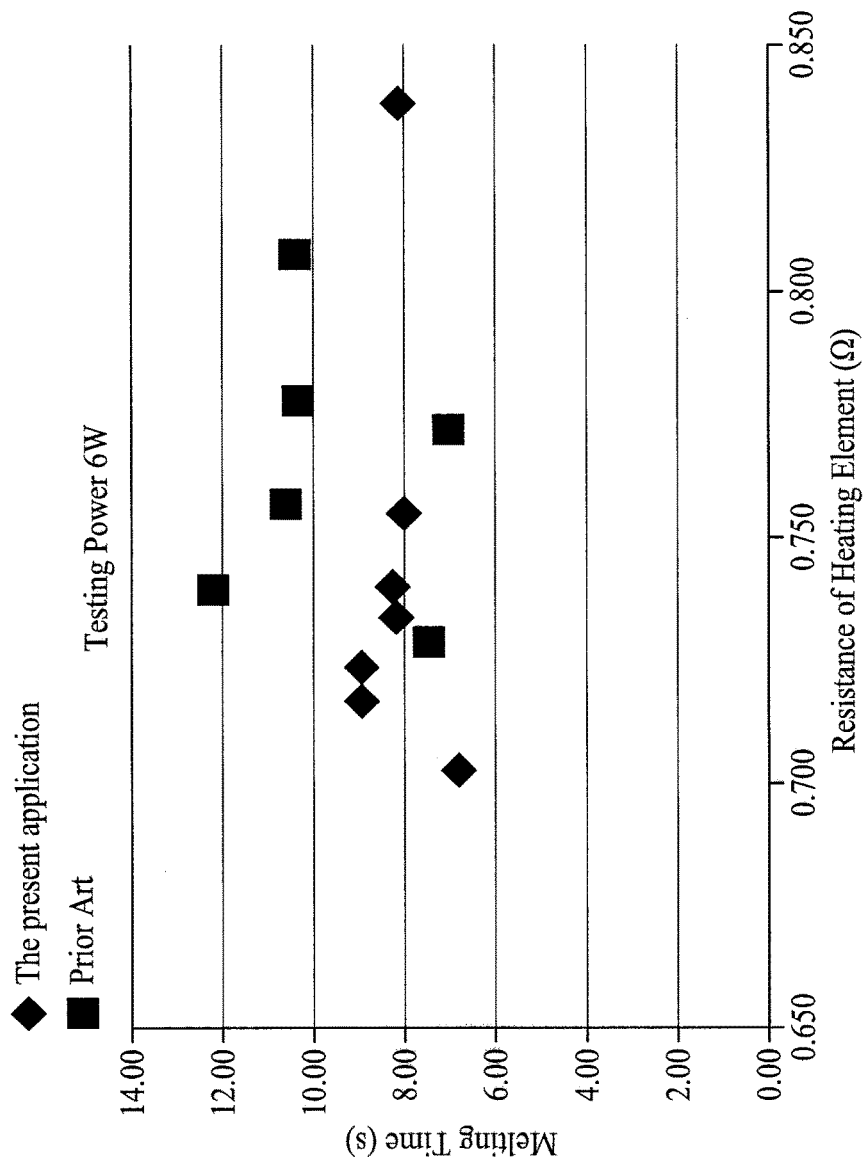
FIGS. 8 to 10 show melting time diagrams of protection devices of a prior art and the present application.
Figure 10:
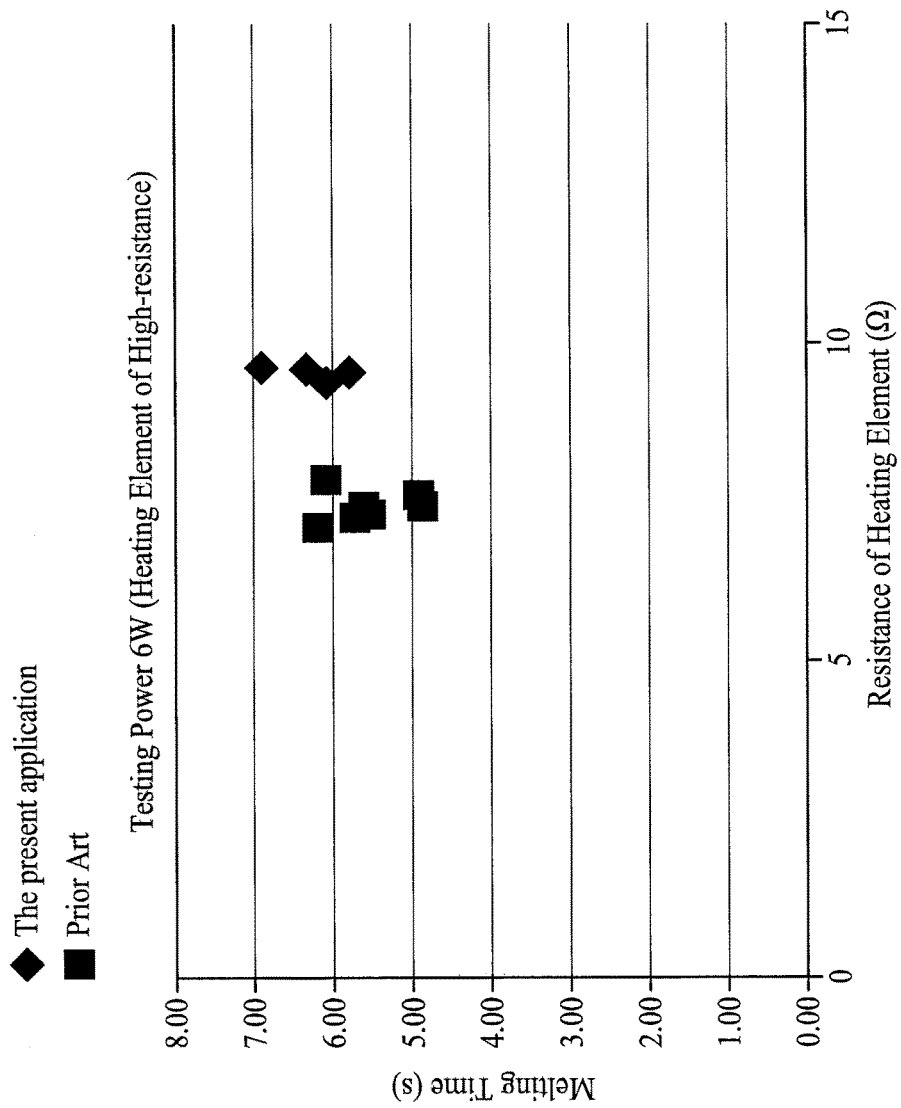

FIG. 8 and FIG. 9 show test results of the protection devices with heating elements of which the resistances is about 0.7-0.9Ω. For the applications of cells in series connection, heating elements of high-resistance are needed. Table 2 shows 6 W testing results of melting time of the protection devices 10 with high-resistance heating elements, and it indicates that the standard deviation of the melting times is 0.4277 seconds. The same testing at 6 W for the traditional protection devices 100 with high-resistance heating elements is conducted as well. The test results for the protection devices of both the present application and the prior art are shown in FIG. 10. The standard deviation of the melting times of the traditional protection devices is 0.493 seconds which is larger than that of the present application.

TABLE 2

| No | Resistance of heating element (Ω) | Resistance of fusible element (Ω) | Voltage (V) | Current (A) | Power (W) | Melting time (s) |
|---|---|---|---|---|---|---|
| 1 | 9.41 | 0.0044 | 7.63 | 0.78 | 5.95 | 6.04 |
| 2 | 9.61 | 0.0042 | 7.75 | 0.79 | 6.12 | 6.32 |
| 3 | 9.64 | 0.0042 | 7.76 | 0.78 | 6.05 | 6.88 |
| 4 | 9.58 | 0.0041 | 7.78 | 0.76 | 5.91 | 5.78 |
| 5 | 9.61 | 0.0042 | 7.75 | 0.79 | 6.12 | 6.32 |
| 6 | 9.64 | 0.0042 | 7.76 | 0.78 | 6.05 | 6.88 |
| 7 | 9.58 | 0.0041 | 7.78 | 0.76 | 5.91 | 5.78 |
| Max. | 9.64 | 0.004 | 7.78 | 0.79 | 6.12 | 6.88 |
| Min. | 9.41 | 0.004 | 7.63 | 0.76 | 5.91 | 5.78 |
| Standard deviation | 0.0736 | 0.0001 | 0.0481 | 0.0116 | 0.085 | 0.4277 |

The data of melting times and standard deviations shown in FIGS. 8, 9 and 10 are summarized in Table 3 below. In both 6 W and 4.5 W tests, the standard deviations of melting times of the present application are less than 1 second, or less than 0.7 seconds. For each group undergoing same testing conditions, the protection device of the present application has lower standard deviation. Lower standard deviation indicates more concentrated melting time distribution. Therefore, the protection device of the present application performs better stability of quality in mass production, and melts rapidly and more accurately to provide superior protection.

TABLE 3

| | Test condition | Resistance of heating element (Ω) | Melting tine(s) | Standard deviation (s) |
|---|---|---|---|---|
| Prior Art | 6 W | 0.729~0808 | 7.02~12.22 | 1.835 |
| Present application | 6 W | 0.703~0.838 | 6.81~8.93 | 0.6586 |
| Prior Art | 4.5 V | 0.738~0.858 | 0.53~2.31 | 0.542 |
| Present application | 4.5 V | 0.702~0.768 | 0.62~1.14 | 0.1491 |
| Prior Art | 6 W | 7.27~7.88 | 4.85~6.23 | 0.493 |
| Present application | 6 W | 9.41~9.64 | 6.04~6.88 | 0.4277 |

Figure 11:
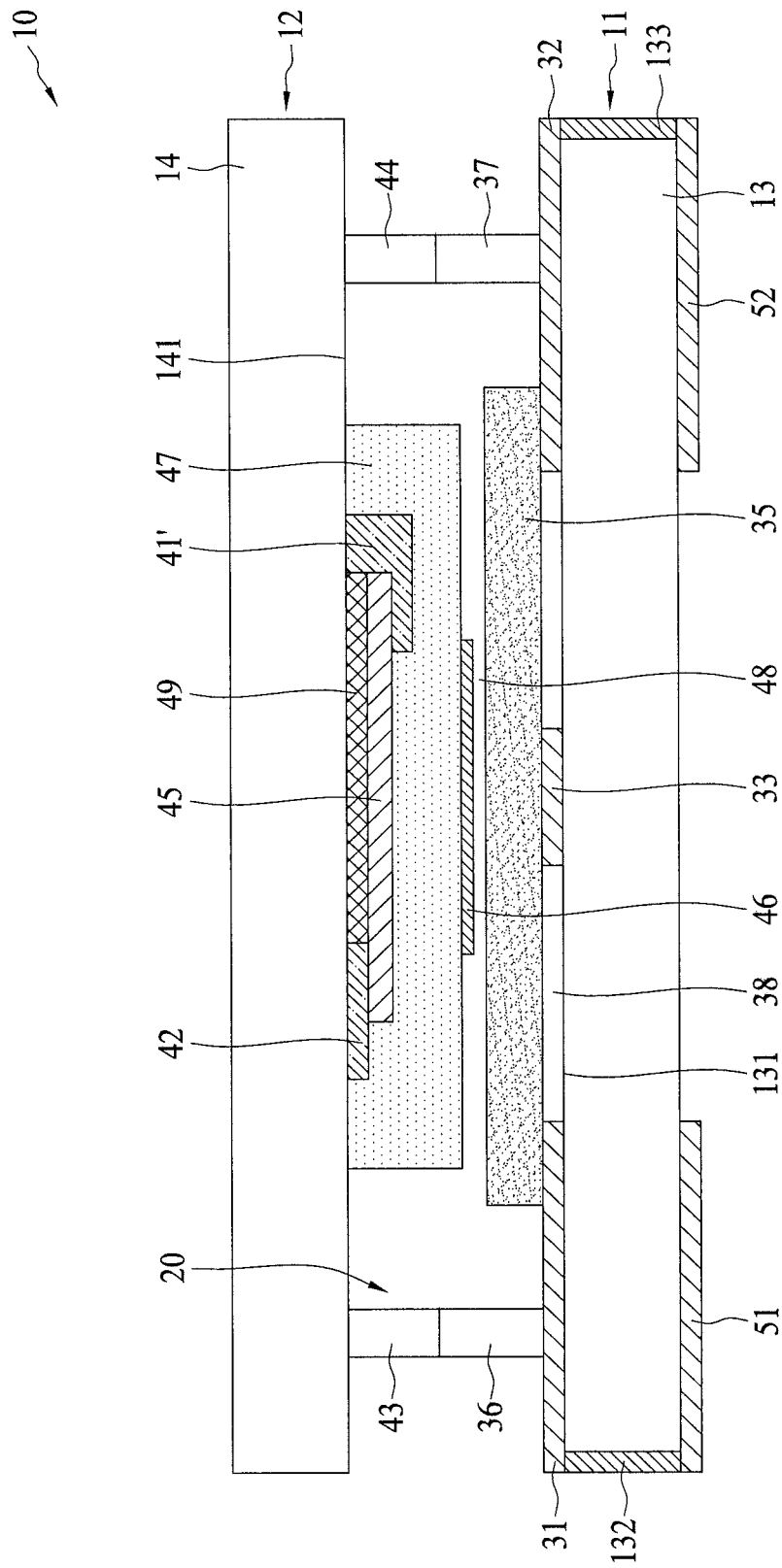
FIG. 11 shows a cross-sectional view of another embodiment along the line 1-1 in FIG. 2.

FIG. 11 shows a cross-sectional view along the line 1-1 of FIG. 2 in accordance with another embodiment of present application. FIG. 11 is similar to FIG. 5, the sixth electrode 42 (extending portion) connects to an end of the heating element 45; however the fifth electrode 41' (extending portion) is L-shaped and the main surface of the heating element 45 in contact with the fifth electrode 41' is on a bottom of an end of the heating element 45. The heating element 45 may be in direct contact with the second substrate 14, or a spacer 49, e.g., glaze, may be formed first on the second substrate 14 for the ease of making the heating element 45 by printing process. In particular, the fifth electrode 41' and the sixth electrode 42 connect to the two ends of the heating element 45 with two primary contact surfaces in opposite sides of the heating element 45. The heating element 45 may be disposed horizontally, or may tilt with an angle. As a result, the contact surfaces of the fifth electrode 41' and sixth electrode 42 allowing current to flow therethrough are far from each other, thereby arcing caused by a short distance between the fifth electrode 41' and the sixth electrode 42 can be prevented.

Figure 12:
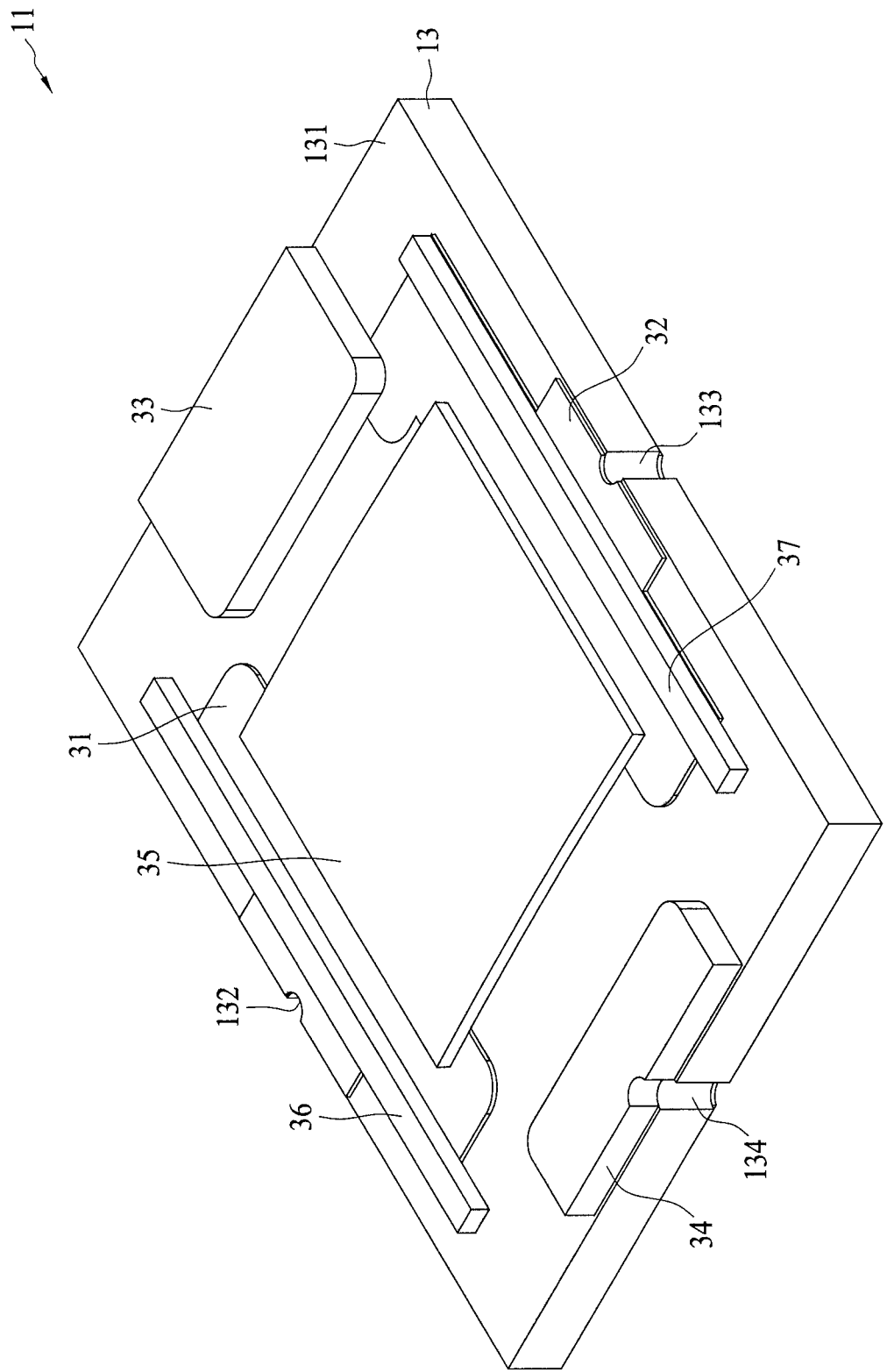
FIG. 12 shows a fusible module of the protection device in accordance with another embodiment of the present application.

FIG. 12 shows a fusible module 11 of a protection device 10 in accordance with another embodiment of the present application. Unlike the structure in FIG. 3, the third electrode 33 in FIG. 12 has no extending portion and the second electrode 32 connects to the third electrode 33 for electrical connection. Without an extending portion, the current goes through a path from the first electrode 31, the fusible element 35, the second electrode 32 to the third electrode 33. In the case of combining the fusible module 11 in FIG. 12 with the heating module 12 in FIG. 4, the equivalent circuit diagram is shown in a dashed-line block in FIG. 13. The circuit of the protection device 10 comprises a fuse 35 and a heater 45. Likewise, the protection device 10 may associate with a detector 71 and a switch 72 to form another circuit protection apparatus 90.

The equivalent circuit diagrams of the protection devices of the aforesaid embodiments comprise two fuses and a heater, or one fuse and a heater. Nevertheless, variant designs in structure or circuit may be used to form a protection device containing two fuses and two heaters, which is also covered by the scope of the present application. In an embodiment, the fusible element may electrically connect to two bonding pads to form a current path and the heating element electrically connect to another two bonding pads to form another current path, so as to independently control the current flowing through the heating element to blow the fusible element.

Figure 13:
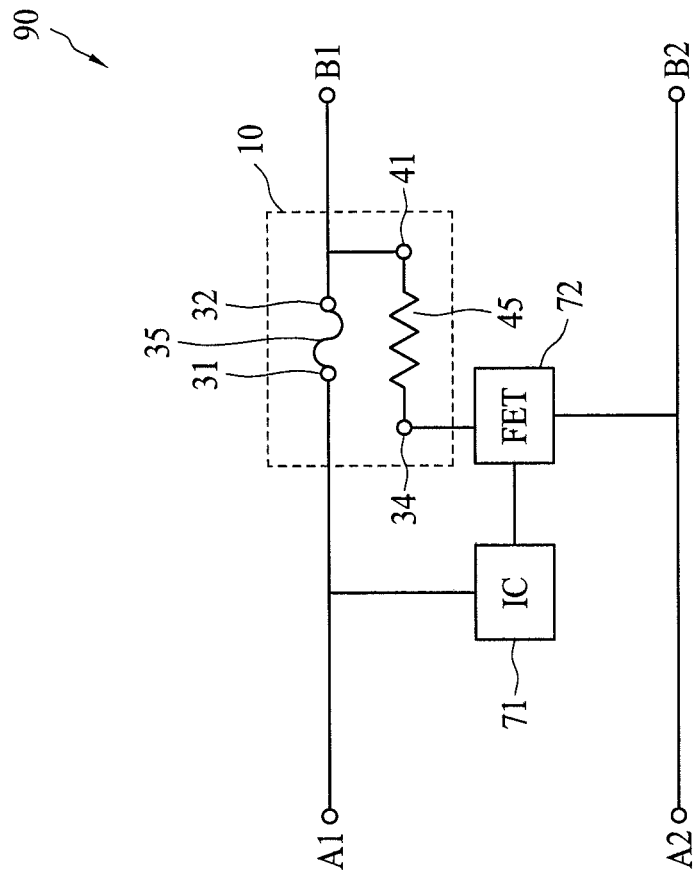
FIG. 13 shows a circuit diagram of a circuit protection apparatus in accordance with another embodiment of the present application.
Figure 14A:
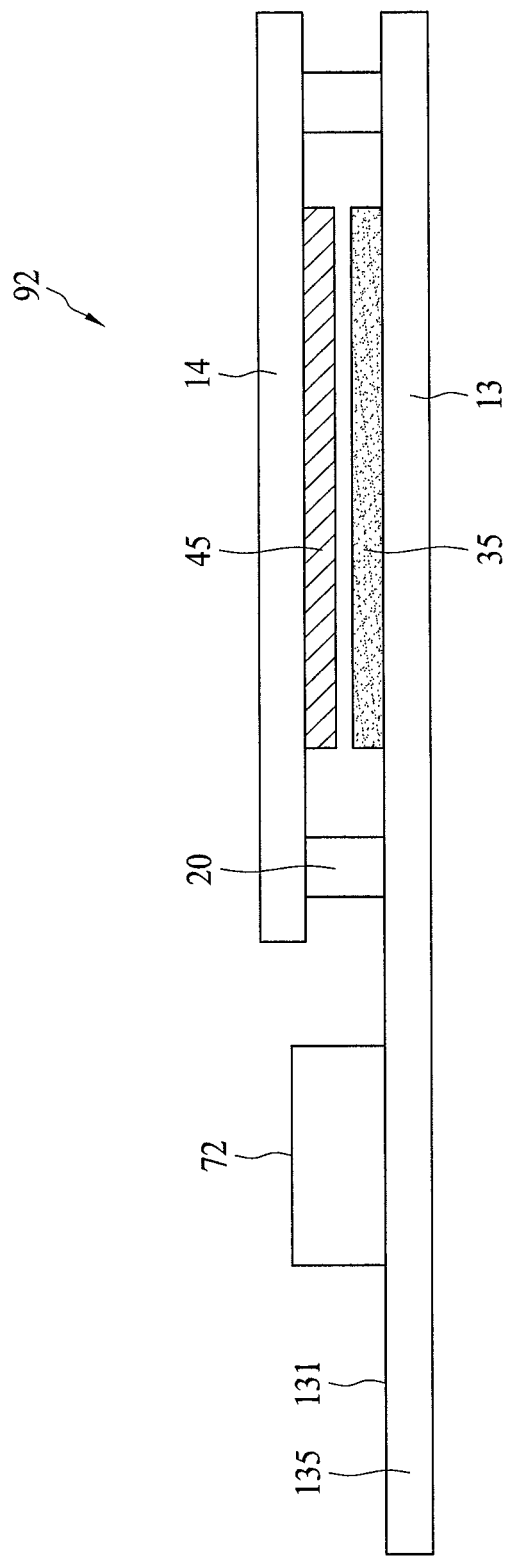
FIGS. 14A to 14D show a circuit protection apparatus in accordance with an embodiment of the present application.
Figure 14B:
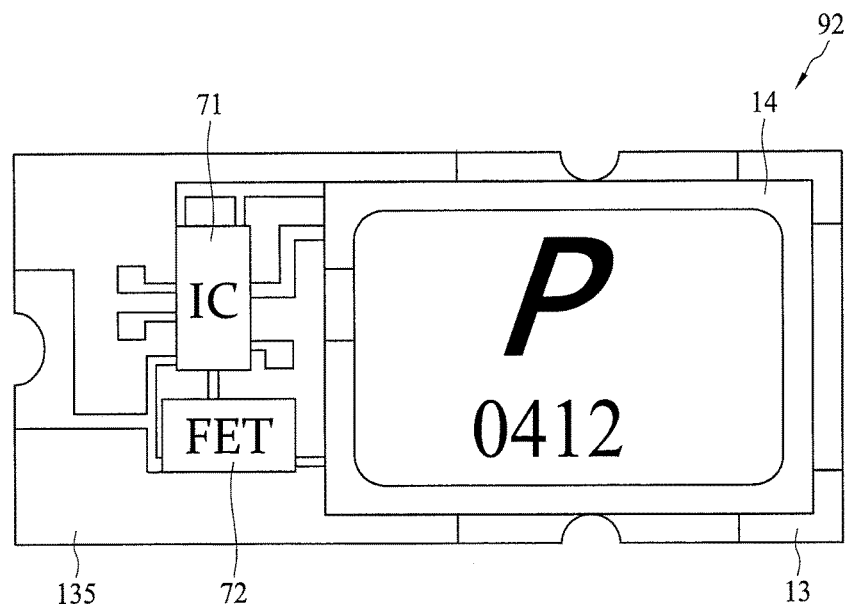
Figure 14C:
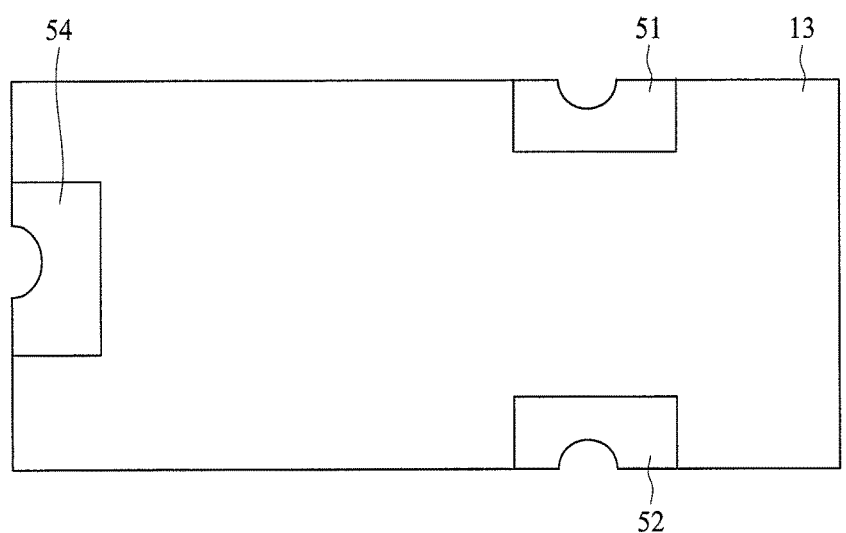
Figure 14D:
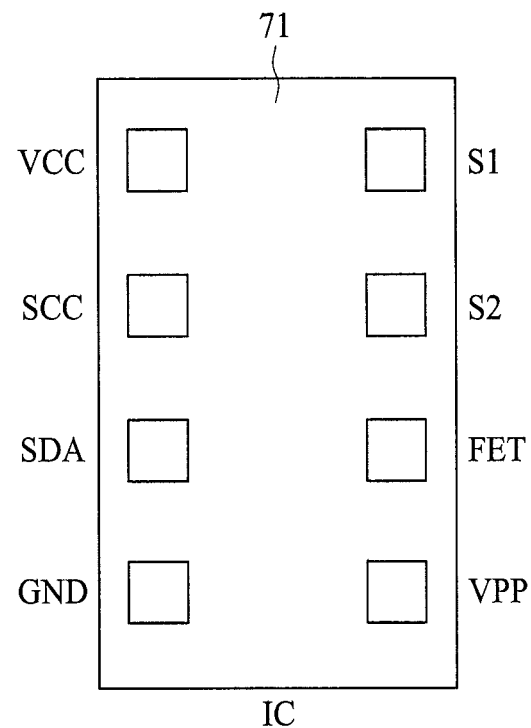
Figure 14D:
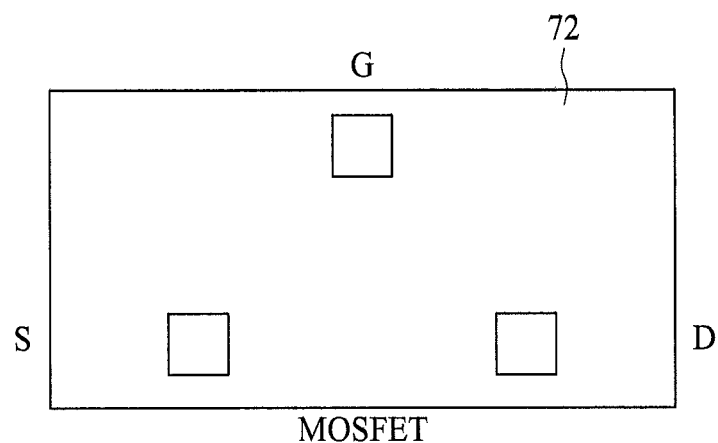

In an embodiment, the circuit protection apparatuses of FIG. 7 and FIG. 13 can be modularized or integrated to incorporate the detector and the switch into the protection device. The integral device can be soldered onto a circuit board directly. FIG. 14A is a side view of a protection circuit apparatus 92, FIG. 14B is a top view of the protection circuit apparatus 92, and FIG. 14C is a bottom view of the protection circuit apparatus 92. In FIG. 14A and FIG. 14B, the first substrate 13 comprises a protruding portion 135 extending at a side of the first substrate 13 and sticking out of the second substrate 14. The detector 71 and the switch 72 are located on the first surface 131 of the protruding portion 135. Compared to FIG. 2, the first substrate 13 carrying the fusible element 35 further extends at a side, e.g., left side, to form the protruding portion 135. As a result, the area of the first substrate 13 is larger than that of the second substrate 14. Circuit layout and bonding pads can be formed on the first surface 131 of the protruding portion 135 to solder the detector 71 and the switch 72 and electrically connect to the fusible element 35 and the heating element 45. In FIG. 14C, the lower surface of the first substrate 13 is provided with a first bonding pad 51, a second bonding pad 52 and a third bonding pad 54. Similarly, the first bonding pad 51 electrically connects to an end of the fusible element 35 and the detector 71. The second bonding pad 52 electrically connects to another end of the fusible element 35 and the heating element 45. The third bonding pad 54 electrically connects to the switch 72. In FIG. 14D, in an embodiment, the detector 71 may be an IC with eight pins and the switch 72 may be a field effect transistor (FET) with gate (G), source (S) and drain (D) electrodes. Through circuit layout on the first substrate 13, the gate electrode of the FET electrically connects to the "FET" pin of the IC, the drain electrode electrically connects to the heating element 45, and the source electrode electrically connects to the third bonding pad 54.

The issues of inefficient blowing and inaccurate melting time of the protection device can be overcome by the present application. In addition to downward absorption of the low-melting metal of the fusible element by the electrodes connected thereto, the heating element heats the fusible element through a metal layer and/or solder from above and accordingly the melted low-melting metal of the fusible element is absorbed upwards to the metal layer due to alloy absorption phenomenon at a high temperature. This prevents the formation of an oxidation layer on the fusible element to facilitate blowing of the fusible element. The present application breaks through the issue of inefficient blowing of the protection device and obtains more accurate melting times.

The present application fully takes advantage of printing technology to make a very thin protection device to meet the requirements of miniaturization and thinning tendencies. Without the use of injection molding, the process can be simplified and the molding expense can be saved. Compared to the prior art, the melting times of the protection devices of the present application are more concentrated (smaller standard deviation) to achieve superior stability of quality.

The above-described embodiments of the present invention are intended to be illustrative only. Numerous alternative embodiments may be devised by persons skilled in the art without departing from the scope of the following claims.

What is claimed is:

1. A protection device, comprising:
a first substrate comprising a first surface;
a second substrate comprising a second surface facing the first surface;
a fusible element disposed on the first surface of the first substrate;
a heating element disposed on the second surface of the second substrate and above the fusible element; and
a first electrode, a second electrode, a third electrode and a fourth electrode disposed on the first surface, the fusible element having two ends connecting to the first electrode and the second electrode, the third electrode connecting to the fusible element as an intermediate electrode and connecting to an end of the heating element, the fourth electrode connecting to another end of the heating element;
wherein the third electrode comprises a primary portion and an extending portion, and the fusible element has a central portion connecting to the extending portion;
wherein the first electrode, the second electrode and the extending portion of the third electrode have the same thicknesses, and the fourth electrode and the primary portion of the third electrode are thicker than the extending portion of the third electrode;
wherein the heating element heats up to blow the fusible element in the event of over-voltage or over-temperature; and
wherein the fusible element comprises low-melting metal and the low-melting metal is absorbed upwards and downwards when the fusible element is blown.

2. The protection device of claim 1, further comprising a metal layer disposed on or above the fusible element to upwards absorb the low-melting metal.

3. The protection device of claim 2, wherein the fusible element is in direct contact with the metal layer, or the fusible element is distanced from the metal layer by a gap.

4. The protection device of claim 3, wherein the gap is filled with solder to connect the fusible element and the metal layer.

5. The protection device of claim 3, wherein the gap is equal to or less than 1.5 mm.

6. The protection device of claim 1, wherein the first substrate is distanced from the second substrate by 0.03-1.5 mm.

7. The protection device of claim 1, wherein the protection device has a thickness of 0.2-2 mm.

8. The protection device of claim 1, wherein the fusible element has a thickness of 0.005-1 mm.

9. The protection device of claim 1, wherein the first electrode, the second electrode and the fourth electrode respectively connects to a first bonding pad, a second bonding pad and a third bonding pad disposed on an underside the first substrate.

10. The protection device of claim 1, wherein the fusible element and the heating element form an equivalent circuit comprising two fuses and a heater.

11. The protection device of claim 1, wherein the second surface of the second substrate is provided with a fifth electrode and a sixth electrode, the fifth electrode connects to the third electrode, and the sixth electrode connects to the fourth electrode.

12. The protection device of claim 11, wherein the fifth electrode and the sixth electrode comprise extending portions connecting to two ends of the heating element.

13. The protection device of claim 11, wherein primary surfaces of the fifth and sixth electrodes in contact with two ends of the heating element are at opposite sides of the heating element.

14. The protection device of claim 1, further comprising an insulating layer disposed between the fusible element and first substrate.

15. The protection device of claim 1, wherein the second substrate has a heat conductivity less than 30 W/m·K.

16. The protection device of claim 1, further comprising a spacer group to form a space between the first surface and the second surface to receive the fusible element and the heating element.

17. The protection device of claim 1, wherein an upper surface of the second substrate is provided with a thermal conductive layer.

18. A circuit protection apparatus, comprising:
a protection device, comprising:
a first substrate comprising a first surface;
a second substrate comprising a second surface facing the first surface;
a fusible element disposed on the first surface of the first substrate; and
a heating element disposed on the second surface of the second substrate and above the fusible element; and
a first electrode, a second electrode, a third electrode and a fourth electrode disposed on the first surface, the fusible element having two ends connecting to the first electrode and the second electrode, the third electrode connecting to the fusible element as an intermediate electrode and connecting to an end of the heating element, the fourth electrode connecting to another end of the heating element;
a detector adapted to sense a voltage drop or a temperature of a circuit to be protected; and
a switch coupled to the detector to receive signals of the detector;
wherein the third electrode comprises a primary portion and an extending portion, and the fusible element has a central portion connecting to the extending portion;
wherein the first electrode, the second electrode and the extending portion of the third electrode have the same thicknesses, and the fourth electrode and the primary portion of the third electrode are thicker than the extending portion of the third electrode;
wherein the switch turns on to allow current to flow through the heating element by which the heating element heats up to blow the fusible element if the detector senses the voltage drop or the temperature exceeding a threshold value; and wherein the fusible element comprises low-melting metal and the low-melting metal is absorbed upwards and downwards when the fusible element is blown.

19. The circuit protection apparatus of claim 18, wherein the detector and the switch are disposed on the first surface.

20. The circuit protection apparatus of claim 18, wherein the first substrate comprises a protruding portion extending at a side and sticking out of the second substrate, and the detector and the switch are disposed on the first surface of the protruding portion.

21. The circuit protection apparatus of claim 18, wherein a lower surface of the first substrate is provided with a first bonding pad, a second bonding pad and a third bonding pad, the first bonding pad electrically connects to an end of the fusible element and the detector, the second bonding pad electrically connects to another end of the fusible element and the heating element, and the third bonding pad electrically connects to the switch.

* * * * *